(12) United States Patent
Ito et al.

(10) Patent No.: US 7,177,539 B2
(45) Date of Patent: Feb. 13, 2007

(54) CAMERA LENS POSITIONING DEVICE USING SHAPE MEMORY ALLOY AND CAMERA USING THE POSITIONING DEVICE

(75) Inventors: Makoto Ito, Toda (JP); Masaaki Inaba, Kamakura (JP)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/316,251

(22) Filed: Dec. 21, 2005

(65) Prior Publication Data

US 2006/0098968 A1 May 11, 2006

Related U.S. Application Data

(63) Continuation of application No. PCT/JP04/09468, filed on Jun. 28, 2004.

(51) Int. Cl.
  *G03B 17/00* (2006.01)
  *G02B 7/04* (2006.01)
(52) U.S. Cl. .......................................... 396/85; 359/823
(58) Field of Classification Search .................. 396/79, 396/72, 85, 97; 359/823
See application file for complete search history.

(56) References Cited

U.S. PATENT DOCUMENTS 4,283,131 A * 8/1981 Ohnuki et al. .............. 196/103
4,330,187 A * 5/1982 Nakagawa ................... 396/103
4,987,314 A * 1/1991 Gotanda et al. ............. 250/551

FOREIGN PATENT DOCUMENTS

| JP | 63193116 A | * | 8/1988 |
| JP | 63-267906 A | | 11/1988 |
| JP | 63267906 A | * | 11/1988 |
| JP | 2000-56208 A | | 2/2000 |
| JP | 2002-77679 A | | 3/2002 |

* cited by examiner

*Primary Examiner*—W. B. Perkey
*Assistant Examiner*—Rishi Suthar
(74) *Attorney, Agent, or Firm*—Cohen Pontani Lieberman & Pavane LLP

(57) ABSTRACT

A camera lens positioning device is provided that comprises a housing, a camera lens supporting member provided in the housing such that it can move in a direction away from a subject and a direction toward the subject, a member which applies force to the lens supporting member in either the direction away from the subject or the direction toward the subject, a first shape memory alloy which can move the lens supporting member in the direction opposite to the direction in which the force applying member applies force by applying force to the lens supporting member in the opposite direction, and a second shape memory alloy which can move a stopping member in the relationship with the lens supporting member. The device can stop the lens supporting member between a first position away from the subject and a second position close to the subject by use of the stopping member. By use of this device, positioning of a camera lens with required accuracy can be provided at low cost, with low electric power and a simple structure and in a small space.

6 Claims, 4 Drawing Sheets

CAMERA LENS POSITIONING DEVICE USING SHAPE MEMORY ALLOY AND CAMERA USING THE POSITIONING DEVICE

RELATED APPLICATION

This application is a U.S. Continuation application under 35 USC 371 of International Application PCT/JP2004/009468 filed 28 Jun. 2004.

BACKGROUND OF THE INVENTION (i) Field of the Invention

The present invention relates to a camera lens positioning device for executing a variable focus mechanism of camera such as an autofocusing mechanism, automatic macro mechanism, electrical macro mechanism or zooming mechanism, more specifically to a camera lens positioning device using a shape memory alloy and a camera using the positioning device.

(ii) Description of the Related Art

To take a better photograph, a depth of field as well as a point of focus must be considered. Factors which determine the depth of field are a permissible maximum confusion circle and a resolution. In general, even with imaging devices of the same size, the maximum confusion circle becomes smaller and the range of the depth of field becomes narrower as the resolution becomes higher. For example, even in the field of camera-equipped cellular phones, the resolution has been increasing in recent years (to 2M or 3M, for example), and the range of the depth of field has been becoming increasingly narrower. Therefore, in particular, when the resolution is increased, the center of the depth of field must be determined at a more appropriate position.

The center of the depth of field is determined by the position of a camera lens, as in the case of the point of focus. Thus, for example, to take a better photograph of a closer subject or farther subject, it is necessary to determine the position of the camera lens as highly accurately as possible. Not only for general digital cameras but also for small-sized cameras to be used in small devices such as cellular phones, it is desired that positioning of a camera lens can be carried out with higher accuracy, at low cost, with low electric power and a simple structure and in a small space.

Meanwhile, among conventional small-sized cameras used in cellular phones and the like, there are cameras having a function called a "macro" mode for positioning a camera lens. This "macro" mode function is used to take a photograph of a closer subject. However, execution of the "macro" mode requires manual operation. This operation is obviously cumbersome.

In contrast, in the field of relatively large-sized cameras, an autofocusing function which requires no manual operation is commonly used. However, in this case, as an actuator for moving a lens, such a device as a direct-current motor (DCM) or a stepping motor (STM) is required. Of these DCMs and STMs, some have a diameter of larger than 4 mm and require a relatively large space for installation. Accordingly, when the DCM or STM is used, it is difficult to reduce the size of the device, and these are not suitable for small devices such as cellular phones. Further, the DCM requires gears and a sensor for moving a lens, while the STM requires driving devices such as a lead screw and gears, an electric circuit and a sensor for moving a lens. Thus, they also have problems of high power consumption, complicated structure, high frequency of occurrence of failures and high costs due to mechanical driving.

To move a camera lens automatically, a technique using a shape memory alloy without using the DCM or STM has been developed. The shape memory alloy is favorably used in such small-sized cameras as used in cellular phones since it does not require such devices as gears. For example, in Japanese Patent Application Laid-Open No. 137155/2000, a device is disclosed that moves the position of a camera lens through contact between two plate-shaped shape memory alloys and a portion of the camera lens disposed between the shape memory alloys by allowing the plate-shaped shape memory alloys to undergo deformation according to a change in temperature. However, the disclosed device is a device which merely moves the position of a camera lens according to a change in temperature and has nothing to do with a technique for positioning a camera lens freely. Further, Japanese Patent Application Laid-Open No. 230457/1994 discloses a diaphragm control device that moves a diaphragm member according to a change in temperature by utilizing the action of two fine-line shape memory alloys disposed at the left and right side of the diaphragm member of a camera. However, this device is a device that moves a diaphragm member according to a change in temperature and has nothing to do with a technique for positioning a camera lens freely, as in the case of the above conventional device.

As for a technique for positioning a camera lens, relatively large-sized cameras generally use a multipoint or multistep focusing technique that allows a camera lens to be positioned at multiple positions. According to this technique, a camera lens can be positioned more accurately and the focus of the camera lens can be adjusted more accurately. However, since cameras using this technique generally use the above stepping motor or DC motor as an actuator for moving a camera lens, the same problems as described above occur.

SUMMARY OF THE INVENTION

The present invention has been conceived to solve the above problems in the prior art. An object of the present invention is to provide a positioning device capable of moving and positioning a camera lens by use of a shape memory alloy and a camera using the positioning device at low cost, with low electric power and a simple structure and in a small space. Further, according to the present invention, a camera lens can be positioned not only at two points but also at three points.

According to the present invention, a camera lens positioning device is provided that comprises a housing, a camera lens supporting member provided in the housing such that it can move in a direction away from a subject and a direction toward the subject, a member which applies force to the lens supporting member in either the direction away from the subject or the direction toward the subject, a first shape memory alloy which can move the lens supporting member in the direction opposite to the direction in which the force applying member applies force by applying force to the lens supporting member in the opposite direction, and a second shape memory alloy which can move a stopping member in the relationship with the lens supporting member. The device can stop the lens supporting member between a first position away from the subject and a second position close to the subject by use of the stopping member.

In the above device, the second shape memory alloy may move the stopping member in a direction crossing the moving direction of the lens supporting member. Further, in the above device, the second shape memory alloy may move the stopping member such that it inserts the stopping member into between the lens supporting member and the housing or withdraws the stopping member from between the lens supporting member and the housing.

In the above device, the lens supporting member may be initially positioned at the first position.

Further, in the above device, the lens supporting member may be stopped between the first position and the second position by the stopping member inserted in between the lens supporting member and the housing.

Further, in the above device, the lens supporting member can move to the second position over a position between the first position and the second position, when the stopping member inserted in between the lens supporting member and the housing is withdrawn by the second shape memory alloy.

Further, in the above device, the moving range in the moving direction of the lens supporting member may be controlled by engaging the lens supporting member with the housing.

According to the present invention, a camera comprising the above positioning device can also be provided.

DETAILED DESCRIPTION OF THE PREFERRED EMBODIMENT

Figure 1:
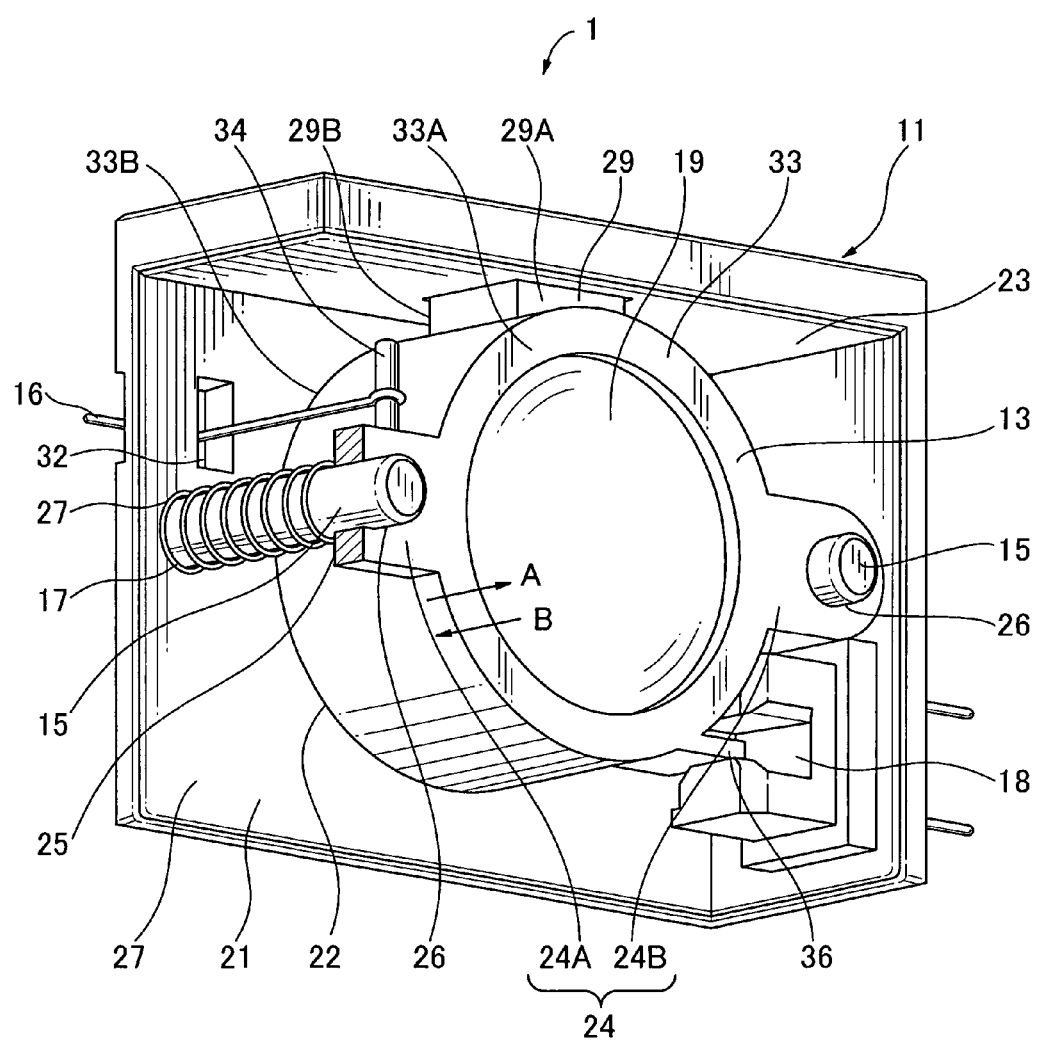
FIG. 1 is a schematic perspective view of the inside of a camera module according to the present invention.
Figure 2:
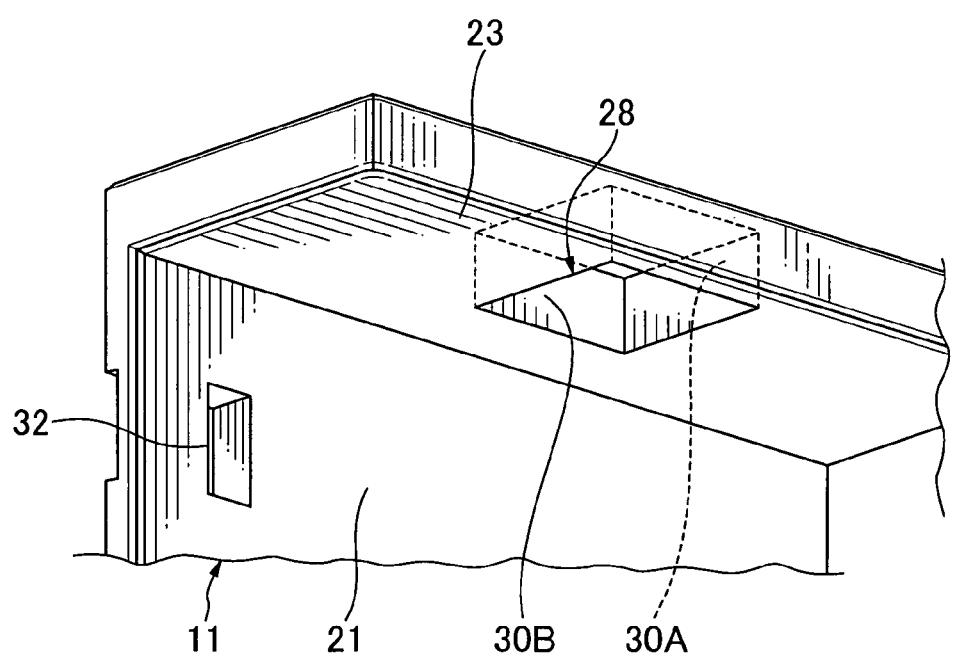
FIG. 2 is a partial perspective view of the housing of the camera module of FIG. 1.

With reference to FIGS. 1 and 2, a description will be given to a camera module according to one embodiment of the present invention. FIG. 1 is a schematic perspective view of the inside of the camera module viewed from its inside. FIG. 2 is a partial perspective view of the housing of the camera module. As is obvious, the camera module 1 shown in these drawings merely constitutes a portion of a camera and is not used as a camera by itself. Descriptions of other constituents will be omitted because they are well known.

The camera module 1 primarily comprises a housing 11, a movable lens barrel 13 which is attached to this housing 11 movably, guide shafts 15 which control the moving direction of this lens barrel 13, coil springs 17 which constantly apply force to the lens barrel 13 in a given direction, a shape memory alloy 16 which drives the lens barrel 13 by applying force as appropriate in the direction opposite to the given direction, and a photosensor 18 for checking the position of a subject.

The main body 33 of the lens barrel 13 is nearly cylindrical. From this main body 33, a vertically protruding portion 29 and nearly semicircular protruding portions 24 extend. The camera lens 19 is fixed around the center hole of the main body 33 of the lens barrel 13. Particularly the front portion of the main body 33 can be inserted into a through-hole 22 that is provided in the front wall 21 of the housing 11. The camera lens 19 and the annular portion (not shown) on the front end of the lens barrel 13 can be exposed at the front of the housing 11 through this through-hole 22. The lens barrel 13 is provided in the through-hole 22 such that the lens barrel 13 can move in the direction in which it moves into or moves out of the housing 11. As described above, since the camera lens 19 is fixed to the lens barrel 13, the camera lens 19 also moves as the lens barrel 13 moves. By this movement, the position of the camera lens 19 is adjusted, i.e., the camera is focused on a subject or zooms the subject.

Nearly semicircular protruding portions 24A and 24B are provided on the left and right sides on the back side of the lens barrel 13 such that they protrude from these sides. Further, a through-hole 26 is provided in the central portion of each of these nearly semicircular protruding portions 24. A guide shaft 15 penetrates each of these through-holes 26. Thus, the lens barrel 13 can be guided along these guide shafts 15. For example, in the example shown, the guide shafts 15 extend in the vertical direction from the inner wall 27 of the front wall of the housing 11 toward the inside of the housing 11 so that the lens barrel 13 can move in the direction vertical to the front of the housing 11. In FIG. 1, a portion of the nearly semicircular protruding portion 24A on the left side in particular is shown in a broken state so as to clarify the relationship between the guide shafts 15 and the nearly semicircular protruding portions 24.

The vertically protruding portion 29 is provided on the top side of the lens barrel 13. The vertically protruding portion 29 has a rectangular cross section. The top of the vertically protruding portion 29 is loosely fitted in a rectangular hole 28 that is provided in the upper wall 23 of the housing 11 upon assembly of the camera module. The length of the vertically protruding portion 29 in the moving direction of the lens barrel 13 is slightly smaller than the length of the hole 28 of the housing 11 in the moving direction of the lens barrel 13 so that the lens barrel 13 can move freely in the hole 28. Further, the length of the vertically protruding portion 29 in the moving direction of the lens barrel 13 is slightly smaller than that of the lens barrel main body 33 in the moving direction of the lens barrel 13. In other words, the rear surface 29A of the vertically protruding portion and the front surface 29B on the opposite side thereof are positioned at slightly retracted positions from the positions of the rear surface 33A of the main body 33 of the lens barrel and the front surface 33B on the opposite side thereof, respectively. In the hole 28 of the housing 11 in which the vertically protruding portion 29 is loosely fitted, a front inner wall 30A and a rear inner wall 30B are disposed facing each other in a direction crossing the moving direction of the lens barrel 13. By these walls 30A and 30B, the moving range of the lens barrel 13 a portion of which is loosely fitted in the hole 28 of the housing 11 can be controlled. That is, the moving range of the lens barrel 13 is limited by collision of the lens barrel 13 with these walls 30A and 30B in its moving direction. At that time, the distance within which the lens barrel 13 can move may be about 0.05 mm to about 0.1 mm, for example. Please also note that the walls 30A and 30B can be integrally molded as portions of the housing 11 by a mold or the like. Providing the walls 30A and 30B as portions of the housing 11 obviates needs for additional members to control the moving range of the lens barrel 13 and a control mechanism to control the moving range.

The coil spring 17 is a member for applying force to the lens barrel 13 in a given direction. The coil spring 17 is provided such that it surrounds the guide shaft 15. One end thereof collides with the inner wall 27 of the front wall of the housing 11, while the other end thereof collides with the front surface 25 of the nearly semicircular protruding portion 24 of the lens barrel 13. By the presence of the coil springs 17, the lens barrel 13 is constantly pressed in the direction away from a subject (i.e. direction indicated by the arrow A in FIG. 1), in other words, in the direction in which the rear surface 29A of the vertically protruding portion collides with the wall 30A. For example, in the case of an SXGA camera, the focus point of the camera at that time is about 1 m, and its depth of field at that time is about 70 cm to infinity.

The shape memory alloy 16 functions as an actuator that moves the lens barrel 13. The shape memory alloy 16 may be formed in the form of a thread, for example. Its diameter is about 1 mm or smaller. The shape memory alloy 16 is taken into the housing 11 through a hole 32 that is provided in the front wall 21 of the housing 11, and one end thereof is fixed to a bar 34 which extends vertically from the top of the nearly semicircular protruding portion 24 of the lens barrel 13. The shape memory alloy 16 contracts when an electric current is applied and gradually recovers to its original length when application of the electric current is ceased. However, an electric current is applied to the shape memory alloy 16 only at the time of shooting, and no electric power is therefore wasted by the shape memory alloy. When the shape memory alloy 16 contracts, the lens barrel 13 at the normal position is moved, against the forces of the coil springs 17, in the direction toward a subject (i.e. direction indicated by the arrow B in FIG. 1), in other words, in the direction in which the front surface 29B of the vertically protruding portion of the lens barrel 13 collides with the wall 30B (i.e. direction toward the wall 30B), through contact between the shape memory alloy 16 and the bar 34. Meanwhile, when the shape memory alloy 16 recovers to its original length, the lens barrel 13 is moved, with the aid of the coil springs 17, in the direction away from the subject (i.e. direction indicated by the arrow A in FIG. 1), in other words, in the direction in which the rear surface 29A of the vertically protruding portion of the lens barrel 13 collides with the wall 30A (i.e. direction toward the wall 30A). When the lens barrel 13 collides with the wall 30B completely, the focus point is about 40 cm, and the depth of field is about 25 cm to 1 m, in the case of the above SXGA camera.

The magnitude of contraction of the shape memory alloy 16 upon application of an electric current can be adjusted to some extent by the amount of the electric current. However, it is difficult to adjust the amount of the electric current, and when such an adjustment mechanism is provided, production costs increase. Further, even when the same amount of an electric current is applied, the magnitude of contraction varies depending on shape memory alloys, while even when the same shape memory alloy is used, the magnitude of contraction varies depending on room temperature, humidity and the like. Although the shape memory alloys may have such unfavorable characteristics as described above, the present invention controls the moving range of the lens barrel 13 by means of mechanical stopping members such as the walls 30A and 30B, so that it can achieve positioning of a camera lens by use of an inexpensive shape memory alloy with required accuracy and a simple structure and at low cost. Further, in the present invention, the accuracy of movement of the camera lens 19 is determined substantially by the accuracy of the distance between the wall 30A and the wall 30B. In addition, since the shape memory alloys have such unfavorable characteristics as described above, a shape memory alloy having a sufficient driving range to cover the moving range of the lens barrel 13, preferably, a shape memory alloy having a somewhat larger driving range than the moving range in which the lens barrel 13 is to move, is preferably used.

The photosensor 18 is used to check the position of a subject. The photosensor 18 projects IR (infrared radiation) to a subject and detects an ON state in which the reflected radiation can be received by a light receiving sensor or an OFF state in which the reflected radiation cannot be received by the light receiving sensor. For example, if the photosensor 18 has detected the ON state, it determines that the subject is located at a relatively close position, while if it has detected the OFF state, it determines that the subject is located at a relatively far position. The result of detection by the photosensor 18 can also be used to adjust the position of the lens barrel 13 automatically. For example, it is also possible to process the detection result by software and determine the amount of an electric current to be applied to the shape memory alloy 16 based on the processed result.

To the photosensor 18, a portion 36 of the lens barrel 13 extends. The extended portion 36 of the lens barrel 13 is a portion for blocking the IR from the photosensor 18. More specifically, it is a portion for checking whether the camera lens 19 operates securely or the camera lens is securely positioned at a desired position based on whether the IR from the photosensor 18 is blocked by the extended portion 36. For example, in the normal state, when the lens barrel 13 is positioned at a position away from the subject (i.e. position moved in the direction indicated by the arrow A in FIG. 1), the IR from the photosensor 18 is not blocked, while when the lens barrel 13 is positioned at a position close to the subject (i.e. position moved in the direction indicated by the arrow B in FIG. 1), the IR from the photosensor 18 is blocked. However, since the radiation blocked state of the photosensor 18 becomes abnormal when a foreign matter enters the moving part of the lens barrel 13 or the camera lens does not operate due to a certain problem, an abnormality in the device can be detected by detecting the radiation blocked state.

Next, a constitution for positioning a camera lens at multiple positions will be described with reference to FIGS. 3 and 4. From the viewpoint of the relationship with an embodiment illustrated in FIGS. 3 and 4, it can be said that the above embodiment of FIGS. 1 and 2 has been described as a so-called two-point adjustment technique for positioning a camera lens at two positions. Meanwhile, the embodiment illustrated in FIGS. 3 and 4 is a so-called multipoint adjustment technique which can position a camera lens among multiple points (three points, in this case) by providing an additional camera lens position at a position between these two points, e.g., at a middle position between the two points.

As described above, there are limitations on the depth of field in taking a photograph. For example, in the case of the camera module 1 adopting the two-point adjustment system illustrated in FIGS. 1 and 2, it has a depth of field of about 60 cm to infinity (focus point=about 1 m) at one camera lens position and has a depth of field of about 9 to 11 cm (focus point=about 10 cm) at the other camera lens position. As is clear, between about 11 cm and 60 cm, a good photograph cannot be taken by this camera module 1.

Figure 3:
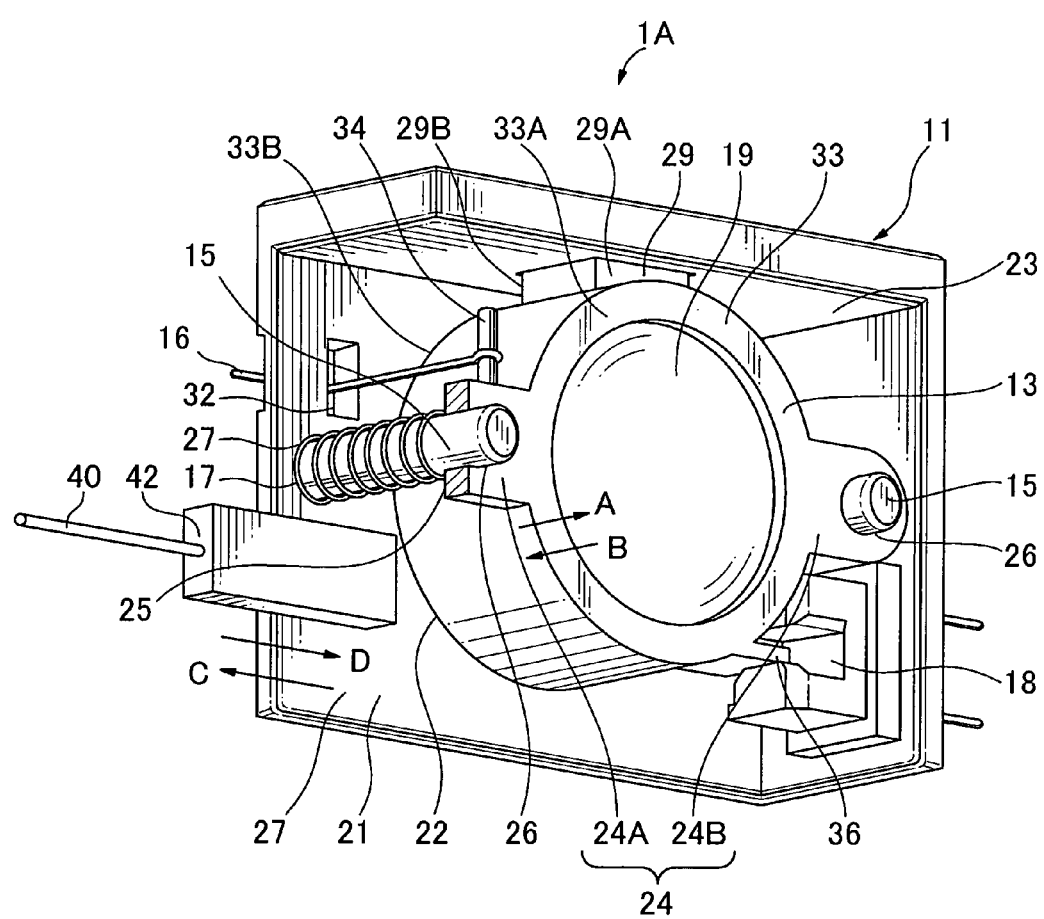
FIG. 3 is a diagram illustrating a constitution for positioning a camera lens at multiple positions in the same manner as in FIG. 1.
Figure 4:
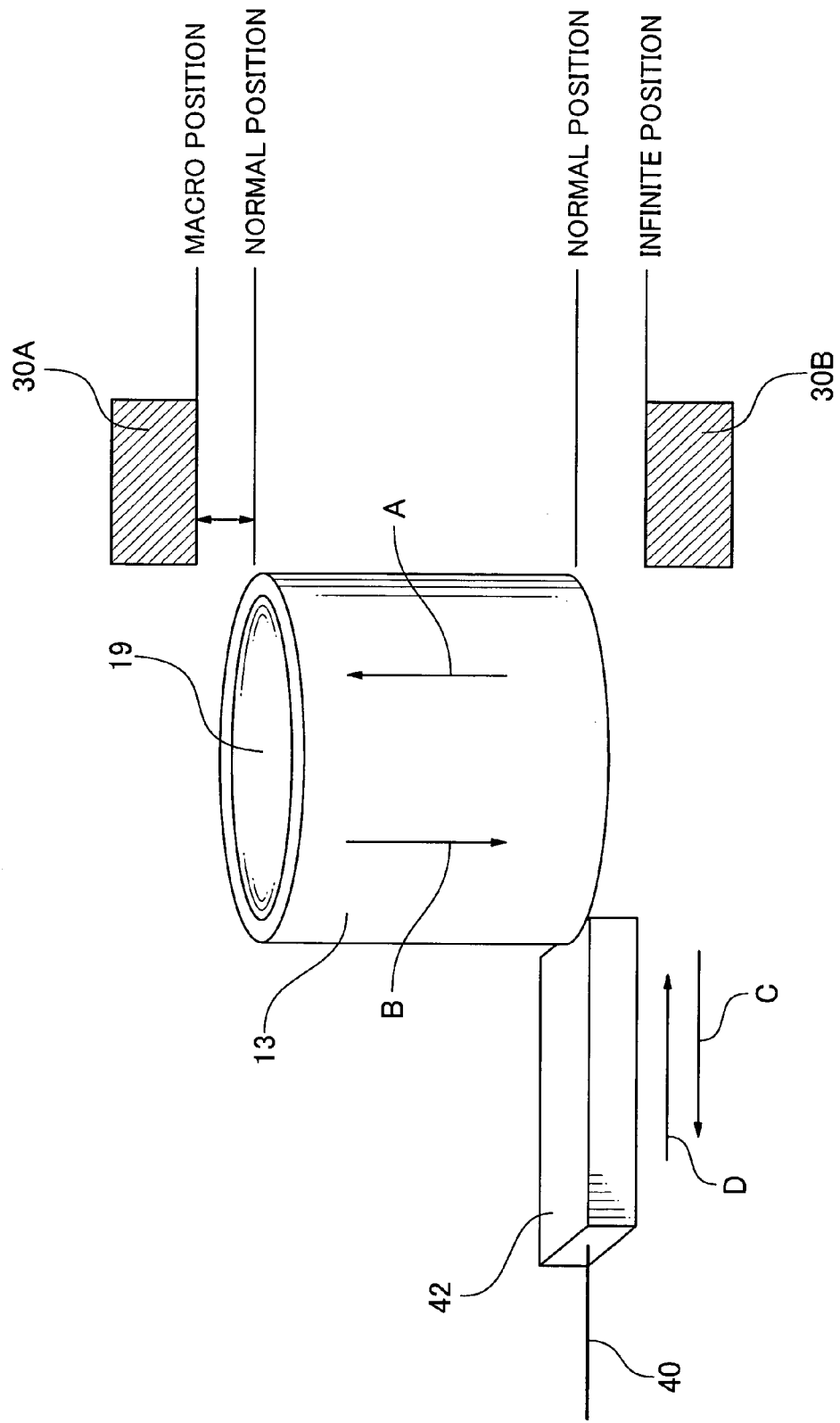
FIG. 4 is a schematic diagram illustrating an exemplary movement based on the constitution of FIG. 3.

A camera module 1A according to the embodiment illustrated in FIGS. 3 and 4 is capable of taking a good photograph over a wider range of the depth of field by having another camera lens position between these two camera lens positions, that is, by having another camera lens position having a depth of field of about 11 to 60 cm between these two camera lens positions, in the case of the above example.

The primary constitutional difference between the embodiment of FIGS. 3 and 4 and the embodiment of FIGS. 1 and 2 is that the embodiment of FIGS. 3 and 4 further comprises a shape memory alloy 40 in addition to the shape memory alloy 16 and a stopper 42 that is moved by the alloy 40. Hereinafter, the difference will be primarily described. Descriptions of the same constituents as those found in the embodiment of FIGS. 1 and 2 will be omitted.

While the shape memory alloy 16 moves the lens barrel 13 as described above, the shape memory alloy 40 moves the stopper 42 for the lens barrel 13, for example, in a direction crossing the moving direction of the lens barrel 13, in the relationship with the lens barrel 13. The stopper 42 can be movably inserted into between the inner wall 27 of the front wall of the housing 11 and the front surface 33B of the lens barrel 13 by the shape memory alloy 40. In the example shown in FIG. 3, the stopper 42 is situated on the same level as that of the lower portion of the lens barrel 13. As will be described in detail below, when the stopper 42 is inserted in between them, the camera module 1A has an additional camera lens position. More specifically, the camera module 1A has a position where the vertically protruding portion 29 of the lens barrel 13 is in contact with the wall 30A of the housing 11 (hereinafter referred to as "macro position"), in other words, a position where the camera lens 19 is retracted innermost in the housing 11, and a position where the vertically protruding portion 29 is in contact with the wall 30B (hereinafter referred to as "infinite position"), in other words, a position where the camera lens 19 is projected outermost from the housing 11, and also has another position where the stopper 42 is interposed between the inner wall 27 of the front wall of the housing 11 and the front surface 33B of the lens barrel 13 (hereinafter referred to as "normal position"), in other words, a position between the above two positions.

The camera lens 19 is initially positioned at the macro position. Its positioning at the macro position is achieved not by the action of the shape memory alloy 13 but by the spring force of the coil springs 17. At that time, no electric current is supplied to the shape memory alloy 16. The camera lens 19 can be moved from the macro position to the normal position or from the macro position to the infinite position easily by software controlling the shape memory alloy 16 and the shape memory alloy, for example.

Hereinafter, an exemplary movement of the camera lens 19 will be described primarily with reference to FIG. 4. FIG. 4 illustrates the positional relationship among the lens barrel 13, the walls 30A and 30B, and the stopper 42 conceptually. Further, since the camera lens 19 is fixed to the lens barrel 13 as described above, the camera lens 19 moves in conjunction with the lens barrel 13. Thus, it may be understood that in the following description the movement of the lens barrel 13 corresponds to the movement of the camera lens 19.

A. Method of Moving from Macro Position to Normal Position

The lens barrel 13 is initially in a state wherein it contacts the wall 30A by the spring force, in other words, at the macro position. At the time of shooting, firstly, an electric current is applied to the shape memory alloy 16 to contract the shape memory alloy 16. As a result, the lens barrel 13 moves toward the normal position and the infinite position (i.e. moves in the direction indicated by the arrow B in FIG. 4). However, since the stopper 42 is interposed between the inner wall 27 of the front wall of the housing 11 and the front surface 33B of the lens barrel 13, the lens barrel 13 collides with the stopper 42 and stops there. That is, the lens barrel 13 stops at the normal position before reaching the infinite position. Thereafter, shooting is carried out. After the shooting, the supply of the electric current to the shape memory alloy 16 is stopped. As a result, the lens barrel 13 returns to the macro position (i.e. moves in the direction indicated by the arrow A in FIG. 4), in other words, returns to the original state, by the spring force.

B. Method of Moving from Macro Position to Infinite Position

As in the above case, the lens barrel 13 is initially in a state wherein it contacts the wall 30A by the spring force, in other words, at the macro position. At the time of shooting, firstly, an electric current is applied to the shape memory alloy 40 to contract the shape memory alloy 40. As a result, the stopper 42 which is interposed between the inner wall 27 of the front wall of the housing 11 and the front surface 33B of the lens barrel 13 is withdrawn from therebetween by moving in the direction indicated by the arrow C in FIG. 4. Then, an electric current is applied to the shape memory alloy 16 to contract the shape memory alloy 16. As a result, the lens barrel 13 moves toward the normal position and the infinite position (i.e. moves in the direction indicated by the arrow B in FIG. 4). However, since the stopper 42 has already been withdrawn in this case, the lens barrel 13 passes the normal position, reaches the infinite position, collides with the wall 30B, and stops, unlike the case described above. Thereafter, shooting is carried out. After the shooting, the supply of the electric current to the shape memory alloy 16 and the shape memory alloy 40 is stopped. As a result, the lens barrel 13 returns to the macro position (i.e. moves in the direction indicated by the arrow A in FIG. 4) by the spring force. Further, as the shape memory alloy 40 recovers to its original shape (length), the stopper 42 returns to its original position (i.e. moves in the direction indicated by the arrow D in FIG. 4), in other words, returns to the original state.

According to the above constitution of the present invention, positioning of a camera lens can be achieved with relatively high accuracy (required accuracy) by use of an inexpensive shape memory alloy. Further, a camera module having such a function can be provided at low cost, with low electric power and a simple structure and in a small space. The present invention can be widely used in products having an autofocusing function. For example, the present invention is very useful for improving the performance of a camera module inside a cellular phone.

In the above embodiment, the coil springs 17 are used to bias the camera lens 19. However, other elastic members such as plate springs and other materials may be used in place of the coil springs. Further, in the above embodiment, the lens barrel is moved in the direction away from a subject by the coil springs and moved in the direction toward the subject by the shape memory alloy. Alternatively, it is also possible that the lens barrel is moved in the direction toward a subject by the coil springs and moved in the direction away from the subject by the shape memory alloy.

Further, in the above embodiment, the hole is formed in the housing, and the protruding portion is formed on the lens barrel. Alternatively, it is also possible that a hole is formed in the lens barrel and a protruding portion is formed on the housing. Further, the housing and the lens barrel do not necessarily engage with each other by the hole and the protruding portion, as long as the moving range of the lens barrel is restricted by the housing. In this case, it is satisfactory as long as the moving range of the lens barrel can be restricted by the housing.

Further, in the embodiment described with reference to FIGS. 3 and 4 in particular, the stopper 42 is inserted into between the inner wall 27 of the front wall of the housing 11 and the front surface 33B of the lens barrel 13. The stopper 42 may be any stopper as long as it can stop the movement of the lens barrel 13 at a middle position, for example. It does not necessarily have to be a stopper which is inserted into therebetween.

Similarly, the stopper 42 may be provided at any place as long as it can stop the movement of the lens barrel 13 at a middle position, for example. The stopper 42 does not necessarily have to be provided at such a place as shown in FIG. 3. For example, it may be provided around the vertically protruding portion 29 or may be even inserted in between the front surface 29B of the vertically protruding portion and the inner wall 27 of the front wall of the housing 11.

Further, according to the present invention, it is also possible to position a camera lens at multiple positions by providing multiple stoppers of different sizes at multiple positions, for example. Therefore, the present invention is not limited to a positioning device for positioning a camera lens at two positions or three positions and can also be easily applied to a positioning device for positioning a camera lens at four or more positions. Further, positions at which the lens barrel 13 can be stopped can be determined easily by adjusting the size of the stopper.

What is claimed is:

1. A camera lens positioning device comprising:
   a housing;
   a camera lens supporting member provided in the housing such that it can move in a direction away from a subject and a direction toward the subject;
   a member which applies force to the lens supporting member in either the direction away from the subject or the direction toward the subject;
   a first shape memory alloy which can move the lens supporting member in the direction opposite to the direction in which the force applying member applies force by applying force to the lens supporting member in an opposite direction; and
   a second shape memory alloy which extends in a direction that crosses the moving direction of the lens supporting member and can move a stopping member in the direction that crosses the moving direction of the lens supporting member, the device being configured to stop the lens supporting member between a first position away from the subject and a second position closer to the subject than the first position by inserting the stopping member in between the camera lens supporting member and the housing or by withdrawing the stopping member from between the camera lens supporting member and the housing.

2. The device of claim 1, wherein the lens supporting member is initially positioned at the first position.

3. The device of claim 1, wherein the lens supporting member is stopped between the first position and the second position by the stopping member inserted in between the lens supporting member and the housing.

4. The device of claim 1, wherein the lens supporting member can move to the second position over a position between the first position and the second position, when the stopping member inserted in between the lens supporting member and the housing is withdrawn by the second shape memory alloy.

5. The device of claim 1, wherein the moving range in the moving direction of the lens supporting member is controlled by engaging the lens supporting member with the housing.

6. A camera comprising the positioning device of claim 1.

* * * * *

UNITED STATES PATENT AND TRADEMARK OFFICE
CERTIFICATE OF CORRECTION

PATENT NO. : 7,177,539 B2
APPLICATION NO. : 11/316251
DATED : February 13, 2007
INVENTOR(S) : Makoto Ito and Masaaki Inaba It is certified that error appears in the above-identified patent and that said Letters Patent is hereby corrected as shown below:

Title Page
Please Add the Foreign Application Priority Data as follows:

[30]   Foreign Application Priority Data:

June 27, 2003 (JP)   …………………………...PCT/JP2003/008220

Signed and Sealed this

Twenty-fifth Day of December, 2007

JON W. DUDAS
*Director of the United States Patent and Trademark Office*